(12) United States Patent
Zhang

(10) Patent No.: US 8,787,473 B2
(45) Date of Patent: Jul. 22, 2014

(54) METHOD AND APPARATUS FOR NOISE ESTIMATION IN ORTHOGONAL FREQUENCY DIVISION MULTIPLEXING (OFDM) SYSTEM

(75) Inventor: Junling Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 9 days.

(21) Appl. No.: 13/505,309

(22) PCT Filed: May 20, 2010

(86) PCT No.: PCT/CN2010/073017
§ 371 (c)(1),
(2), (4) Date: May 1, 2012

(87) PCT Pub. No.: WO2010/148853
PCT Pub. Date: Dec. 29, 2010

(65) Prior Publication Data
US 2012/0219050 A1    Aug. 30, 2012

(30) Foreign Application Priority Data
Nov. 10, 2009    (CN) .......................... 2009 1 0210821

(51) Int. Cl.
*H04K 1/10* (2006.01)
*H04L 27/28* (2006.01)
*H04L 25/02* (2006.01)
*H04L 27/26* (2006.01)
*H04L 25/03* (2006.01)

(52) U.S. Cl.
CPC .......... *H04L 25/022* (2013.01); *H04L 25/0224* (2013.01); *H04L 25/03299* (2013.01); *H04L 27/2647* (2013.01)
USPC ....................................................... 375/260

(58) Field of Classification Search
None
See application file for complete search history.

(56) References Cited

U.S. PATENT DOCUMENTS 5,548,819 A * 8/1996 Robb ............................. 455/59
6,904,110 B2 * 6/2005 Trans et al. ................... 375/350
(Continued)

FOREIGN PATENT DOCUMENTS

| CN | 1823485 A | 8/2006 |
|---|---|---|
| CN | 101557378 A | 10/2009 |
| WO | 2008066338 A1 | 6/2008 |

OTHER PUBLICATIONS

International Search Report dated Sep. 2, 2010 for PCT/CN2010/073017.

*Primary Examiner* — Chieh M Fan
*Assistant Examiner* — Bahman Badipour
(74) *Attorney, Agent, or Firm* — Banner & Witcoff, Ltd.

(57) ABSTRACT

The present invention discloses a method and apparatus for performing noise estimation in an OFDM system. The method comprises: a channel estimation coefficient generation module generating a channel estimation coefficient $w_k$, where k is an integer between $$-\frac{N_{tap}}{2} \text{ and } \frac{N_{tap}}{2},$$

and $N_{tap}$ is a positive integer greater than 1, $0<w_k<1$; a channel estimation module calculating a channel estimation based on a received signal on a subcarrier of an OFDM symbol and the channel estimation coefficient $w_k$; a noise estimation calculation module calculating a noise estimation based on the received signal on the subcarrier of the orthogonal frequency division multiplexing symbol and the channel estimation; a correction factor calculation module calculating a correction factor $\beta$ based on the channel estimation coefficient $w_k$ generated by the channel estimation coefficient generation module; and a correction module correcting the noise estimation output by the noise estimation calculation module based on the correction factor $\beta$.

6 Claims, 2 Drawing Sheets

(56) References Cited

U.S. PATENT DOCUMENTS

| | | | |
|---|---|---|---|
| 7,103,316 B1 * | 9/2006 | Hall ........................... 455/63.1 |
| 7,379,851 B2 * | 5/2008 | Koizumi et al. ............. 702/189 |
| 7,561,627 B2 * | 7/2009 | Chow et al. .................. 375/260 |
| 7,702,042 B2 * | 4/2010 | Desperben et al. ........... 375/340 |
| 7,848,469 B2 * | 12/2010 | Majonen ...................... 375/346 |
| 7,929,592 B1 * | 4/2011 | Okumura et al. ............. 375/148 |
| RE42,317 E * | 5/2011 | Al-Dhahir et al. ........... 348/614 |
| 8,526,552 B1 * | 9/2013 | Mayrench et al. ........... 375/346 |
| 2002/0181390 A1 * | 12/2002 | Mody et al. .................. 370/208 |
| 2005/0107039 A1 * | 5/2005 | Lindoff et al. ............... 455/63.1 |
| 2005/0243791 A1 * | 11/2005 | Park et al. .................... 370/343 |
| 2005/0281324 A1 * | 12/2005 | Wallen .......................... 375/148 |
| 2006/0034398 A1 * | 2/2006 | Reznik et al. ................ 375/340 |
| 2006/0251156 A1 * | 11/2006 | Grant et al. ................... 375/148 |
| 2007/0053417 A1 * | 3/2007 | Nagata et al. ................ 375/147 |
| 2007/0058735 A1 * | 3/2007 | Ghosh .......................... 375/260 |
| 2007/0142009 A1 * | 6/2007 | Scarpa et al. ................. 455/132 |
| 2007/0183537 A1 * | 8/2007 | Matsumoto ................... 375/340 |
| 2007/0280097 A1 | 12/2007 | Yang et al. |
| 2007/0287382 A1 * | 12/2007 | Catreux-Erceg et al. .... 455/63.1 |
| 2008/0153428 A1 * | 6/2008 | Han et al. ....................... 455/69 |
| 2008/0165901 A1 * | 7/2008 | Krupka ......................... 375/340 |
| 2008/0181325 A1 | 7/2008 | Parker et al. |
| 2008/0225934 A1 * | 9/2008 | Mourad et al. ............... 375/227 |
| 2008/0285674 A1 * | 11/2008 | Tseng et al. .................. 375/267 |
| 2009/0022217 A1 * | 1/2009 | Kimata ......................... 375/232 |
| 2009/0046582 A1 * | 2/2009 | Sarkar et al. ............... 370/230.1 |
| 2009/0075686 A1 * | 3/2009 | Gomadam et al. ........... 455/500 |
| 2009/0291642 A1 * | 11/2009 | Cozzo et al. ................ 455/67.13 |
| 2009/0296863 A1 * | 12/2009 | Tirkkonen et al. ........... 375/346 |
| 2010/0067620 A1 * | 3/2010 | Reznik et al. ................ 375/340 |
| 2010/0111223 A1 * | 5/2010 | Thomas et al. ............... 375/296 |
| 2010/0124893 A1 * | 5/2010 | Clevorn et al. ............. 455/226.3 |
| 2010/0197262 A1 * | 8/2010 | Hosokawa et al. ......... 455/234.1 |
| 2011/0026566 A1 * | 2/2011 | Grant ............................ 375/144 |
| 2011/0051618 A1 * | 3/2011 | Li et al. ........................ 370/252 |
| 2011/0096853 A1 * | 4/2011 | Jayaraman et al. ........... 375/260 |
| 2011/0142102 A1 * | 6/2011 | Okumura et al. ............. 375/148 |
| 2011/0249588 A1 * | 10/2011 | Petersson et al. ............ 370/252 |
| 2011/0305268 A1 * | 12/2011 | Lindoff et al. ............... 375/227 |
| 2012/0027115 A1 * | 2/2012 | Grant et al. ................... 375/267 |
| 2012/0195397 A1 * | 8/2012 | Sayana et al. ................ 375/340 |

\* cited by examiner

METHOD AND APPARATUS FOR NOISE ESTIMATION IN ORTHOGONAL FREQUENCY DIVISION MULTIPLEXING (OFDM) SYSTEM

TECHNICAL FIELD

The present invention relates to the filed of wireless communication technology, and in particularly, to a method and apparatus for performing noise estimation in an Orthogonal Frequency Division Multiplexing (OFDM) system.

BACKGROUND OF THE RELATED ART

In the orthogonal frequency division multiplexing system, a relatively common and simple method for estimating a received signal noise variance is to use a modulus square of a difference between a channel estimation signal obtained in a pilot position and a received signal as an observed quantity, and filter or average pilot of the observed quantity located on different subcarriers and OFDM symbols to obtain estimation of the noise variance. The most advantage of this algorithm is simple operation and low complexity, but there are large errors in its result.

In order to obtain smaller estimation errors of the noise variance, different scholars have proposed different algorithms, such as an algorithm calculating channel time domain impulse response based on Inverse Fast Fourier Transform (IFFT) for pilot (mode 1), an algorithm based on autocorrelation function singular value decomposition for channel frequency domain impulse response (mode 2) and an algorithm based on QR decomposition for Fast Fourier Transform (FFT) operator (mode 3).

Taking the algorithm based on IFFT for pilot as an example, the basic operation and characteristics of such an algorithm are explained. Frequency domain channel impulse response of an OFDM frequency domain received signal is FFT/Discrete Fourier Transform (DFT) of time domain impulse response thereof. If the IFFT/IDFT is performed on one OFDM frequency domain received pilot symbol, channel time domain impulse response can be obtained. Generally, time expansion of one multipath channel is limited. Therefore, a portion of the obtained channel time domain impulse response beyond maximum time delay of the channel is pure noise. As shown in FIG. 1, in the pure noise portion, i.e., the time domain Additive White Gaussion Noise (AWGN) portion, a modulus square of each time sampling point is calculated and then averaged to obtain estimation of the OFDM received signal noise variance. Errors in the estimation result of this algorithm are much less than that of the first algorithm mentioned above, however its operation has one more N point IFFT than the first algorithm and thus is more complex. The algorithm principles of the algorithm based on autocorrelation function singular value decomposition for channel frequency domain impulse response (mode 2) and the algorithm based on QR decomposition for Fast Fourier Transform (FFT) operator (mode 3), similar to that of the algorithm based on IFFT, are both used for estimating the noise variance by calculating the variance of the pure noise portion beyond the channel time domain impulse response, and errors in their results are less than the first algorithm and thus they are more complex.

In addition, the algorithm based on IFFT as shown in FIG. 1 also has another weakness. Because it is impossible that each multipath time delay for the actual multipath channel falls on an integral multiple of sampling interval of a receiver exactly, splitting of the multiple paths in an indefinite time is inevitably resulted in. Furthermore, in the actual OFDM system, a virtual carrier set to zero physically is introduced in frequency domain due to transition protection between different frequency bands, resulting in infinite expansion of the channel time domain impulse response subsequent to the IFFT as well. The infinite expansion of the channel time domain impulse response caused by the two effects described above will cause increase in the estimation errors of the noise variance.

SUMMARY OF THE INVENTION

A technical problem to be solved by the present invention is to provide a method and apparatus for performing noise estimation in an orthogonal frequency division multiplexing system so as to obtain smaller estimation errors while maintaining lower complexity.

In order to solve the above problem, the present invention provides an apparatus for performing noise estimation in an orthogonal frequency division multiplexing system comprising: a channel estimation coefficient generation module, a channel estimation module and a noise estimation calculation module connected to each other in sequence, a correction factor calculation module connected to an output of the channel estimation coefficient generation module, and a correction module connected to both the correction factor calculation module and noise estimation calculation module.

The channel estimation coefficient generation module is configured to generate a channel estimation coefficient $w_k$, where k is an integer between $$-\frac{N_{tap}}{2} \text{ and } \frac{N_{tap}}{2},$$

and $N_{tap}$ is a positive integer greater than 1, $0<w_k<1$.

The channel estimation module is configured to calculate a channel estimation based on a received signal on a subcarrier of an orthogonal frequency division multiplexing symbol and the channel estimation coefficient $w_k$.

The calculation module is configured to calculate a noise estimation based on the received signal on the subcarrier of the orthogonal frequency division multiplexing symbol and the channel estimation.

The correction factor calculation module is configured to calculate a correction factor $\beta$ based on the channel estimation coefficient $w_k$ generated by the channel estimation coefficient generation module.

The correction module is configured to correct the noise estimation output by the noise estimation calculation module based on the correction factor $\beta$.

The apparatus may further be characterized in that:
the correction factor calculation module is configured to calculate the correction factor $\beta$ based on the following formula: $\beta=1+|w_0|^2-(w_0^*+w_0)+\alpha$, where $w_0^*$ is a conjugate value of $w_0$, and $\alpha$ is a residual noise correction factor, $0<\alpha<1$.

The apparatus may further be characterized in that:
the correction module is configured to use a ratio of the noise estimation to the correction factor as the corrected noise estimation.

The apparatus may further be characterized in that:
the noise estimation calculation module comprises a cache unit configured to calculate the noise estimation after caching the received signal on the subcarrier of the orthogonal frequency division multiplexing symbol.

In order to solve the problem described above, the present invention provides a method for performing noise estimation in an orthogonal frequency division multiplexing system comprising: a channel estimation coefficient generation module generating a channel estimation coefficient $w_k$, where k is an integer between $$-\frac{N_{tap}}{2} \text{ and } \frac{N_{tap}}{2},$$

and $N_{tap}$ is a positive integer greater than 1, $0 < w_k < 1$; a channel estimation module calculating a channel estimation based on a received signal on a subcarrier of an orthogonal frequency division multiplexing symbol and the channel estimation coefficient $w_k$; a noise estimation calculation module calculating a noise estimation based on the received signal on the subcarrier of the orthogonal frequency division multiplexing symbol and the channel estimation; a correction factor calculation module calculating a correction factor β based on the channel estimation coefficient $w_k$ generated by the channel estimation coefficient generation module; and a correction module correcting the noise estimation output by the noise estimation calculation module based on the correction factor β.

The method may further be characterized in that:

in the step of calculating the correction factor β, the correction factor β is obtained based on the following formula: $\beta = 1 + |w_0|^2 - (w_0^* + w_0) + \alpha$, where $w_0^*$ is a conjugate value of $w_0$, and α is a residual noise correction factor, $0 < \alpha < 1$.

The method may further be characterized in that:

in the step of correcting the noise estimation, the correction module uses a ratio of the noise estimation to the correction factor as the corrected noise estimation.

The method may further be characterized in that:

in the step of calculating the noise estimation, the noise estimation calculation module calculates the noise estimation after caching the received signal on the subcarrier of the OFDM symbol.

The present invention allows smaller errors to be obtained while maintaining lower complexity.

PREFERRED EMBODIMENTS OF THE PRESENT INVENTION

Figure 1:
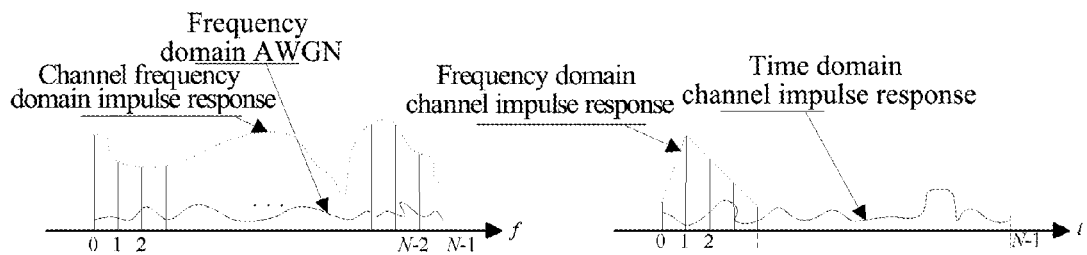
FIG. 1 is a schematic diagram of an algorithm for estimating noise variance based on IFFT for pilot in the prior art.
Figure 2:
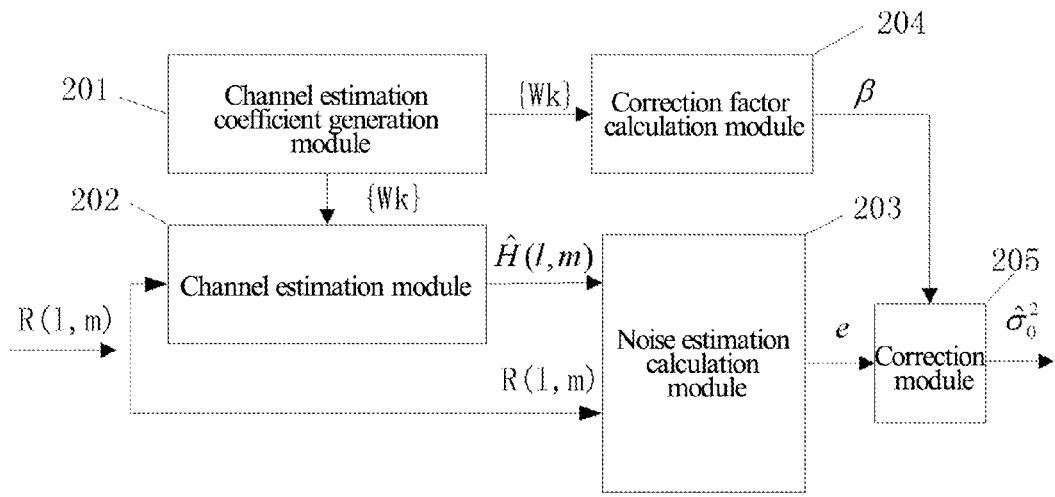
FIG. 2 is a block diagram of an apparatus for estimating noise variance in accordance with an embodiment.
Figure 3:
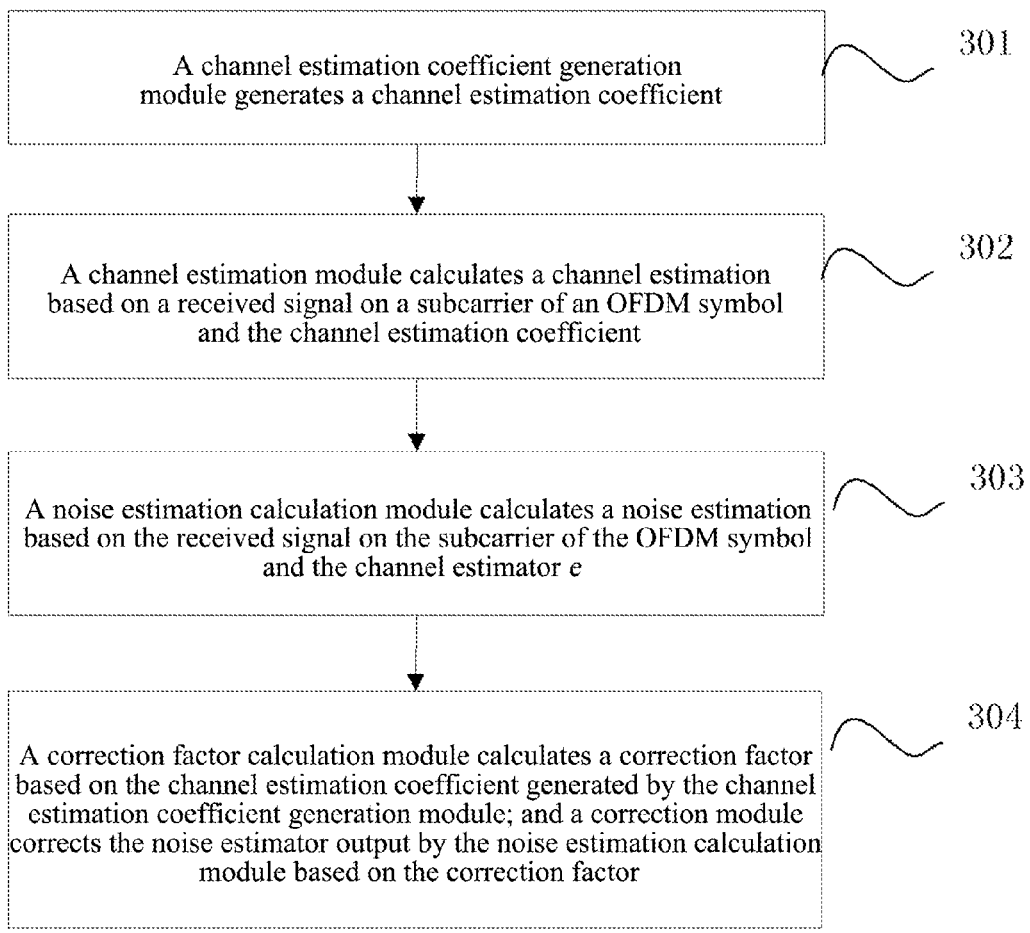
FIG. 3 is a flow diagram of a method for estimating noise variance in accordance with an embodiment.

As shown in FIG. 2, an apparatus for performing noise estimation in an orthogonal frequency division multiplexing system comprises a channel estimation coefficient generation module 201, a channel estimation module 202 and a noise estimation calculation module 203 connected to each other in sequence, a correction factor calculation module 204 connected to an output of the channel estimation coefficient generation module 201, and a correction module 205 connected to both the correction factor calculation module 204 and noise estimation calculation module 203.

The channel estimation coefficient generation module 201 is configured to generate a channel estimation coefficient $w_k$, where k is an integer between $$-\frac{N_{tap}}{2} \text{ and } \frac{N_{tap}}{2},$$

and $N_{tap}$ is a positive integer greater than 1, $0 < w_k < 1$.

The channel estimation module 202 is configured to calculate a channel estimation based on a received signal on a subcarrier of an orthogonal frequency division multiplexing symbol and the channel estimation coefficient $w_k$.

The noise estimation calculation module 203 is configured to calculate a noise estimation based on the received signal on the subcarrier of the orthogonal frequency division multiplexing symbol and the channel estimation.

The correction factor calculation module 204 is configured to calculate a correction factor β based on the channel estimation coefficient $w_k$ generated by the channel estimation coefficient generation module 201. The correction factor β may be calculated in various ways based on the channel estimation coefficient $w_k$. A typical way is to use the following formula: $\beta = 1 + |w_0|^2 - (w_0^* + w_0) + \alpha$, where $w_0^*$ is a conjugate value of $w_0$, and α is a residual noise correction factor, $0 < \alpha < 1$. The value of α may be an empirical value in practical applications.

The correction module 205 is configured to correct the noise estimation output by the noise estimation calculation module 203 based on the correction factor β. Specifically, a ratio of the noise estimation to the correction factor is used as the corrected noise estimation.

The noise estimation calculation module 203 also comprises a cache unit configured to calculate the noise estimation after caching the received signal on the subcarrier of the orthogonal frequency division multiplexing symbol.

A method for performing noise estimation in an orthogonal frequency division multiplexing system comprises the following steps.

In step 301, a channel estimation coefficient generation module generates a channel estimation coefficient $w_k$, where k is an integer between $$-\frac{N_{tap}}{2} \text{ and } \frac{N_{tap}}{2},$$

and $N_{tap}$ is a positive integer greater than 1, $0 < w_k < 1$.

In step 302, a channel estimation module calculates a channel estimation based on a received signal on a subcarrier of an orthogonal frequency division multiplexing symbol and the channel estimation coefficient $w_k$.

Let a received signal on the $m^{th}$ subcarrier on the $l^{th}$ OFDM symbol be R(l,m), $$R(l,m) = X(l,m) \cdot H(l,m) + N_0(l,m). \tag{1}$$

In the above formula, X(l,m) is a transmitting signal; $N_0$(l, m) is complex AWGN, and both its real part and imaginary part satisfy $$N\left(0, \frac{\sigma_0^2}{2}\right)$$

distribution;

$$H(l, m) = \sum_{k=0}^{L-1} h_k \cdot e^{j\frac{2\pi}{N} m \tau_k}$$

is slow fading channel frequency domain impulse response, $$h(n) = \sum_{k=0}^{L-1} h_k \cdot \delta(n - \tau_k)$$

is channel time domain impulse response, and L is the number of multiple paths of the channel. Let a pilot subcarrier set on the $l^{th}$ OFDM symbol be {Pilot}, $X(l,m)|_{m\in\{Pilot\}}\equiv 1$, formula (1) may be rewritten as formula (2):

$$R(l,m)=H(l,m)+N_0(l,m), m\in\{Pilot\}. \qquad (2)$$

On the other hand, the channel estimation on the $l^{th}$ OFDM symbol may be equivalent to a finite impulse response (FIR) filter, no matter what way is used. Therefore, the channel estimation of the $m^{th}$ subcarrier on the $l^{th}$ OFDM symbol obtained by the formula (2) may be written as formula (3):

$$\hat{H}(l,m) = \sum_{\substack{k=-\frac{N_{tap}}{2} \\ m+k\in(Pilot)}}^{\frac{N_{tap}}{2}-1} w_k \cdot R(l, m+k) \qquad (3)$$

$$= H(l, m) + w_0 \cdot N_0(l, m) + N'_0(l, m)$$

where $N_{tap}$ refers to the total number of the coefficients $w_k$ and $N_{tap}$ is a positive integer greater than 1. In formula (3), in the event of $m\in\{Pilot\}$, $w_0 \cdot N_0(l,m)$ is noise related to the received signal on the $m^{th}$ subcarrier on the $l^{th}$ OFDM symbol; $N_0'(l,m)$ is the rest equivalent white noise, the power of which is $\sigma_0'^2 = \alpha \cdot \sigma_0^2, 0<\alpha<1$, and $\alpha$ is determined by only the channel estimation algorithm and is far less than 1.

In step 303, a noise estimation calculation module calculates a noise estimation e based on the received signal on the subcarrier of the OFDM symbol and the channel estimation.

Considering formula (2), the noise estimator e is constructed, as in formula (4):

$$e=E\{(R(l,m)-\hat{H}(l,m))\cdot(R(l,m)-\hat{H}(l,m))^*\}|_{m\in\{Pilot\}} \qquad (4)$$

As stated above, formula (4) has low complexity, but has large bias compared with the real AWGN variance $\sigma_0^2$ of formula (1).

In step 304, a correction factor calculation module calculates a correction factor $\beta$ based on the channel estimation coefficient $w_k$ generated by the channel estimation coefficient generation module; and a correction module corrects the noise estimation output by the noise estimation calculation module based on the correction factor $\beta$.

Considering formula (3), formula (4) may be rewritten to obtain formula (4a), and noise variance estimation can be obtained by, formula (5):

$$e=E\{(R(l,m)-\hat{H}(l,m))\cdot(R(l,m)-\hat{H}(l,m))^*\}|_{m\in\{Pilot\}}$$

$$=\sigma_0^2 \cdot (1+|w_0|^2-(w_0^*+w_0)+\alpha) \qquad (4a)$$

$$\hat{\sigma}_0^2 = E\{(R(l,m)-\hat{H}(l,m))\cdot(R(l,m)-\hat{H}(l,m))^*\}|_{m\in\{Pilot\}}/\beta \qquad (5)$$

In the above formula, $\beta=1+|w_0|^2-(w_0^*+w_0)+\alpha$ is the correction factor, and $w_0^*$ is a conjugate value of $w_0$.

In the foregoing description, formulas (1), (2) and (4) are implementation methods in the prior art. The method shown in formula (4) is a relatively common noise variance estimation method in the existing OFDM system, and its most advantage is simple algorithm and disadvantage is larger error. Formula (3) is an understanding of the channel estimation algorithm in the existing OFDM system. According to the understanding, a new noise variance estimation method (5), which is an innovative point of the present invention, may be deduced.

The present invention continues using the channel estimation method in the prior art to further correct the noise estimation, and obtain smaller estimation errors while maintaining lower complexity.

The above description is only the preferred embodiments of the present invention and is not intended to limit the present invention. Various modifications and variations to the present invention may be made by those skilled in the art. Any modification, equivalent substitution and variation made within the spirit and principle of the present invention should be covered in the scope of the appended claims of the present invention.

INDUSTRIAL APPLICABILITY

The present invention allows smaller errors to be obtained while maintaining lower complexity.

What is claimed is:

1. An apparatus for performing noise estimation in an orthogonal frequency division multiplexing system comprising: a channel estimation coefficient generation module, a channel estimation module and a noise estimation calculation module connected to each other in sequence, a correction factor calculation module connected to an output of the channel estimation coefficient generation module, and a correction module connected to both the correction factor calculation module and noise estimation calculation module; wherein the channel estimation coefficient generation module is configured to generate a channel estimation coefficient $w_k$, where k is an integer between $$-\frac{N_{tap}}{2} \text{ and } \frac{N_{tap}}{2},$$

and $N_{tap}$ is a positive integer greater than 1, $0<|w_k|<1$;

the channel estimation module is configured to calculate a channel estimation based on a received signal on a subcarrier of an orthogonal frequency division multiplexing symbol and the channel estimation coefficient $w_k$;

the noise estimation calculation module is configured to calculate a noise estimation based on the received signal on the subcarrier of the orthogonal frequency division multiplexing symbol and the channel estimation;

the correction factor calculation module is configured to calculate a correction factor $\beta$ based on the channel estimation coefficient $w_k$ generated by the channel estimation coefficient generation module, wherein the correction factor $\beta$ is obtained based on the following formula: $\beta=1+|w_0|^2-(w_0^*+w_0)+\alpha$, where $w_0^*$ is a conjugate value of $w_0$, and $\alpha$ is a residual noise correction factor, $0<\alpha<1$; and the correction module is configured to correct the noise estimation output by the noise estimation calculation module based on the correction factor $\beta$.

2. The apparatus according to claim 1, wherein the correction module is configured to use a ratio of the noise estimation to the correction factor as the corrected noise estimation.

3. The apparatus according to claim 2, wherein the noise estimation calculation module comprises a cache unit configured to calculate the noise estimation after caching the received signal on the subcarrier of the orthogonal frequency division multiplexing symbol.

4. A method for performing noise estimation in an orthogonal frequency division multiplexing system comprising:

generating, by a channel estimation coefficient generation module, a channel estimation coefficient $w_k$, where k is an integer between $-\frac{N_{tap}}{2}$ and $\frac{N_{tap}}{2}$, and $N_{tap}$ is a positive integer greater than 1, $0<|w_k|<1$;

calculating, by a channel estimation module, a channel estimation based on a received signal on a subcarrier of an orthogonal frequency division multiplexing symbol and the channel estimation coefficient $w_k$;

calculating, by a noise estimation calculation module, a noise estimation based on the received signal on the subcarrier of the orthogonal frequency division multiplexing symbol and the channel estimation;

calculating, by a correction factor calculation module, a correction factor $\beta$ based on the channel estimation coefficient $w_k$ generated by the channel estimation coefficient generation module, wherein the correction factor $\beta$ is obtained based on the following formula: $\beta=1+|w_0|^2-(w_0^*+w_0)+\alpha$, where $w_0^*$ is a conjugate value of $w_0$, and $\alpha$ is a residual noise correction factor, $0<\alpha<1$; and correcting, by a correction module, the noise estimation output by the noise estimation calculation module based on the correction factor $\beta$.

5. The method according to claim 4, wherein
in the step of correcting the noise estimation, the correction module uses a ratio of the noise estimation to the correction factor as the corrected noise estimation.

6. The method according to claim 4, wherein
in the step of calculating the noise estimation, the noise estimation calculation module calculating the noise estimation after caching the received signal on the subcarrier of the OFDM symbol.

\* \* \* \* \*